United States Patent Office 3,592,820
Patented July 13, 1971

3,592,820
SUBSTITUTED CATECHOL SALTS OF BENZO-TRIAZOLES OR PHENYLHYDRAZINES
Keith Coupland, Hornsea, and John Pennington, Willerby, England, assignors to BP Chemicals (U.K.) Limited, formerly known as Distillers Chemicals and Plastics Limited, London, England
No Drawing. Filed Dec. 18, 1967, Ser. No. 691,125
Claims priority, application Great Britain, Dec. 24, 1966, 57,868/66
Int. Cl. C07c 109/04; C07d 55/04
U.S. Cl. 260—308B
10 Claims

ABSTRACT OF THE DISCLOSURE

The invention is novel compound which may be produced by reaction of a substituted catechol with either phenylhydrazine or a substituted phenylhydrazine or with benzotriazole or a substituted benzotriazole. The reaction may be carried out in an inert solvent, such as a hydrocarbon. The compounds are useful as antioxidants in lubricant compositions.

---

The present invention is concerned with certain novel organic compounds and their use in lubricating oil compositions.

It is known to add antioxidants to lubricating oil compositions. Some compounds, while being effective antioxidants, give rise to copper corrosion, for example in bearings.

It is an object of the present invention to provide antioxidants which also have improved properties with respect to copper corrosion.

Accordingly the invention provides compounds of the formula:

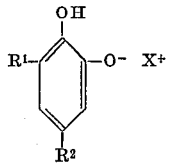

where $X^+$ is a cation of formula

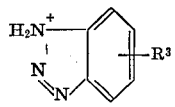

or

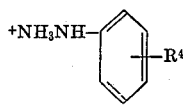

where $R^1$ is an alkyl, aralkyl, alkenyl or aralkenyl radical, and $R^2$, $R^3$ and $R^4$ are hydrogen, halo or alkyl, aralkyl, alkenyl, aralkenyl, or alkoxyl radicals.

$R^1$ is preferably a bulky substituent in which the carbon atom immediately adjacent to the aromatic ring is attached directly to 3 or 4 carbon atoms, such as a tert butyl, alpha-methylbenzyl or alpha, alpha-dimethylbenzyl radical, and may suitably contain from 4 to 12 carbon atoms. $R^2$ may be, for example, a methyl or ethyl radical or the same as $R^1$, and preferably contains from 1 to 12 carbon atoms.

The novel compound may be made by the reaction of a substituted catechol with either benzotriazole or a substituted benzotriazole, or with phenylhydrazine or a substituted phenylhydrazine. The reaction may be carried out at room temperature in an inert solvent such as hydrocarbon, for example benzene or n-heptane.

The novel compounds find use as antioxidants in lubricant compositions. The lubricant base can be, for example, a hydrocarbon oil of the type used in crankcase oil formulations for internal combustion engines. Alternatively, the lubricant base can be a synthetic lubricant, for example an alkyl ester of an aliphatic dicarboxylic acid, such as dioctyl sebacate, or a base which is described and claimed in British patent specification 1,036,692.

The lubricant compositions may also contain additives such as viscosity index improvers, pour point depressants, dispersants and detergents.

The invention is further illustrated in the following examples.

EXAMPLE 1

22.2 gm. of 3,5:ditert butyl catechol was dissolved in n-heptane and 10.8 g., of phenyl hydrazine added with constant stirring. A white crystalline precipitate rapidly formed and was isolated by filtration. The structure of the product, established by molecular weight, infra-red spectroscopy and chemical analysis is:

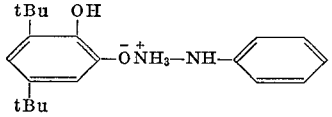

EXAMPLE 2

22.2 gm. of 3,5:ditert butyl catechol was dissolved in n-heptane, and a saturated solution of 11.9 gm. of benzotriazole in benzene added. The mixture was set aside, and gave an 80% yield of white crystals. The structure of the product is believed to be

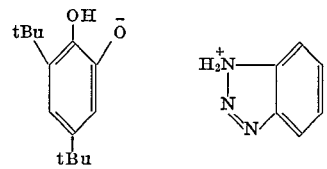

EXAMPLE 3

35 gm. of 3:5 bis(alpha,alpha-dimethyl benzyl)catechol was dissolved in a mixture of n-heptane and benzene and 11 gm. of phenyl hydrazine added with stirring. A finely divided white precipitate was isolated in high yield and identified as:

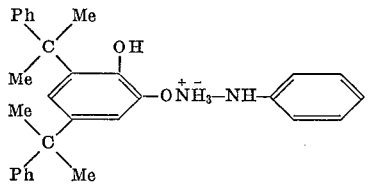

EXAMPLE 4

The products of Examples 1 and 2 were subjected to a test in which air is passed at a rate of 2 litres/hour into a 40 g. sample of the test fluid maintained at 425° F. for 48 hours. A copper test piece of surface area 10 cm.² is immersed in the test fluid throughout the test. The metal weight loss, the viscosity increase and weight loss of the test fluid are reported in Table 1. The test was also carried out with no antioxidant present and in the presence of 2-hydroxy-3,5-ditertbutyl-4'-methyl diphenylamine (A), as an antioxidant.

TABLE 1

| Base fluid | Additive (percent) | Properties of the oxidised materials | | | |
|---|---|---|---|---|---|
| | | Corrosion inhibitor, percent | Copper corrosion (mg./cm.²) | Fluid viscosity increase percent | Fluid weight loss, percent |
| Trimethylol propane tricaprylate (TMPTC). | None ..... None | ... | 0.02 | 260 | 16.1 |
| | Material A (0.5). | ...do..... | 1.60 | 130 | 8.0 |
| | Material Ex. 1 (0.5) | ...do..... | 0.73 | 120 | 17.8 |
| | Material Ex. 2 (0.5). | ...do..... | 0.01 | 280 | 17.2 |

EXAMPLE 5

Table 2 below demonstrates the copper corroding properties of the product of Example 3, in comparison with additive A and benzotriazole, when subjected to the test described in Example 4.

TABLE 2

| Base fluid | Additives, percent | | | Used blend properties | | | | |
|---|---|---|---|---|---|---|---|---|
| | A | Benzotriazole | Benzotriazole dibutyl catechol condensate | Copper corrosion | | | Fluid | |
| | | | | Loss mg. | Loss (mg./² | Wt. loss, percent | 100° F., viscosity increase, percent | Varnish (mg.) |
| TMPTC | | | 0-5 | 0-1 | ---------- | 17-2 | 280 | 0-167 |
| TMPTC (66%) 33% cyclohexamine 2,2,6,6, tetra (beta-propionate n-butyl ester). | | | 0-5 | Nil | ---------- | 11-1 | 145 | 0-027 |
| | 0-5 | 0-1 | ---------- | 1-9 | 0-2 | 6-6 | 63 | 0-036 |

EXAMPLE 6

The test described above at Example 4 was also carried out in the presence of the antioxidants N-acetyl-2-hydroxy-3:5 ditert butyl-4'-methyl diphenylamine (B) and N-benzoyl-2-hydroxy-3:5-ditert butyl-4'-methyl diphenylamine (C). The copper corroding properties of the product of Example 2 in the presence of additive A and additive B, in comparison with benzotriazole, a known copper corrosion inhibitor, were examined and are reported in Table 3.

The lubricant base fluid used in these tests comprised. 33% cyclohexanone 2,2,6,6 beta-propionate n-butyl ester with 66% TMPTC.

TABLE 3

| No. | Antioxidant, percent | Corrosion inhibitor, percent | Copper corrosion (mg./cm.⁻²) | Fluid loss, percent |
|---|---|---|---|---|
| 1 | Additive B (0.5) | ---------- | 2.79 | 6.85 |
| 2 | Additive C (0.5) | ---------- | 3.80 | 5.20 |
| 3 | Additive B (0.5) | Product of Example 2 (0.5.). | 0.01 | 4.90 |
| 4 | Additive C (0.5) | ......do...... | 0.04 | 6.70 |
| 5 | Additive B (0.5) | Benzotriazole (0.1) | 0.16 | 12.1 |
| 6 | Additive C (0.5) | ......do...... | 2.40 | 3.59 |
| 7 | Additive B (0.5) | Benzotriazole (0.2) | 0.38 | 13.9 |

We claim:

1. Compounds of the formula:

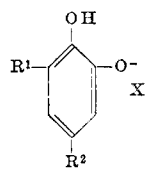

where X is a cation of formula

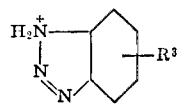

or

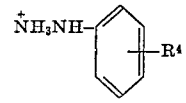

where R¹ is an alkyl or aralkyl radical of 4–12 carbon atoms, and R², R³ and R⁴ are hydrogen, halogen or alkyl, aralkyl or alkoxyl radicals of 1–12 carbon atoms.

2. Compounds according to claim 1 wherein R¹ is a radical in which the carbon atom immediately adjacent to the aromatic ring is attached directly to 3 or 4 carbon atoms.

3. A process for making compounds claimed in claim 1 which comprises reacting a compound of the formula

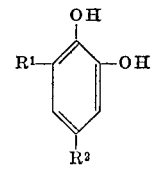

with a compound of the formula

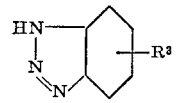

in an inert solvent.

4. A compound according to claim 1, wherein R¹ and R² are tertiary butyl.

5. A compound according to claim 1, wherein R¹ and R² are alpha,alpha-dimethylbenzyl.

6. A compound of the formula

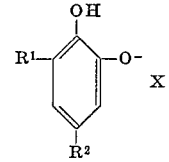

where X is a cation of the formula

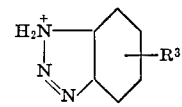

where R¹ is an alkyl or aralkyl radical of 4–12 carbon atoms, and R² and R³ are hydrogen, halogen or alkyl, aralkyl or alkoxy radicals of 1–12 carbon atoms.

7. A compound of the formula

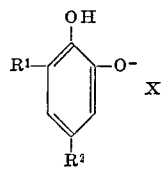

where X is a cation of the formula

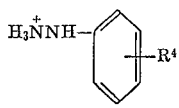

where $R^1$ is an alkyl or aralkyl radical of 4–12 carbon atoms, and $R^2$ and $R^4$ are hydrogen, halogen or alkyl, aralkyl or alkoxy radicals of 1–12 carbon atoms.

8. A compound according to claim 6, wherein $R^1$ and $R^2$ are tertiary butyl, and $R^3$ is hydrogen.

9. A compound according to claim 7, wherein $R^1$ and $R^2$ are tertiary butyl, and $R^4$ is hydrogen.

10. A compound according to claim 7, wherein $R^1$ and $R^2$ are alpha,alpha-dimethylbenzyl, and $R^4$ is hydrogen.

References Cited

Ciusa et al.: Chem. Abstracts, vol. 5, p. 1744 (1911).

ALTON D. ROLLINS, Primary Examiner

U.S. Cl. X.R.

106—14; 208—19; 252—51.5R, 392; 260—567.5